Jan. 13, 1959 W. A. VITTANDS 2,868,623
MANUFACTURE OF NEUTRAL STANNOUS SALTS
Filed July 7, 1954

INVENTOR.
WALTER A. VITTANDS

BY *Kenway Janney*
*Witter & Hildreth*

ATTORNEYS

United States Patent Office 2,868,623
Patented Jan. 13, 1959

2,868,623

MANUFACTURE OF NEUTRAL STANNOUS SALTS

Walter A. Vittands, Jamaica Plain, Mass., assignor, by mesne assignments, to Second Bank-State Street Trust Company, Boston, Mass., a Massachusetts banking corporation Application July 7, 1954, Serial No. 441,754

4 Claims. (Cl. 23—98)

In applying protective chemical coatings in accordance with the process of United States Patent 2,478,954 stannous salts particularly the chloride is used, and an outstanding difficulty encountered in using commercially available stannous chloride is its relatively high acidity. Hence, it is necessary at least partially to neutralize the aqueous treating solution and it is generally advisable to add stabilizers to prevent premature deterioration, but even then sludge formation in the treating tank is sometime excessive.

The principal object of the present invention is to provide an efficient and reliable process of preparing a relatively pure aqueous stannous chloride concentrate which is substantially free from acid and stable over long periods of time, which may be readiy diluted to produce a treating bath which does not require the adjustments heretofore necessary, and which minimizes sludge formation.

A further object is to provide a simple and efficient apparatus for the continuous production of the concentrate which does not require constant supervision.

Further objects will be apparent from a consideration of the following disclosure and accompanying drawings wherein.

In accordance with the present invention hydrochloric acid is reacted with metallic tin, preferably in the form of thin scraps such as feathered or mossy tin, to form an acidfied stannous chloride solution. The commercially available form of hydrochloric acid is suitable for use but if desired it may be diluted somewhat.

After having produced the aqueous acidified stannous chloride solution there is separately prepared a hydrated stannous oxide and to this end an aliquot of predetermined size may be drawn from the main batch and treated as hereinafter described, or the hydrated oxide may be prepared from a stannous salt solution from an outside source. In either case the hydrated stannous oxide is preferably prepared by adding a suitable water soluble alkaline material to the aqueous stannous salt. Practical considerations suggest the use of such alkali metal compounds as sodium hydroxide, carbonate and bicarbonate, although potassium and ammonium hydroxide, etc., and the various other compounds well known to a chemist may be used. Because of its cost and the fact that it effervesces in the presence of a slight amount of acid, sodium carbonate is the preferred alkali.

After having prepared the hydrated stannous oxide it is added directly to the acidified stannous chloride solution in an amount sufficient to react with and neutralize the free acid present, thereby forming a relatively pure, substantially neutral aqueous stannous chloride concentrate which may be used immediately or stored for future use.

Figure 1:
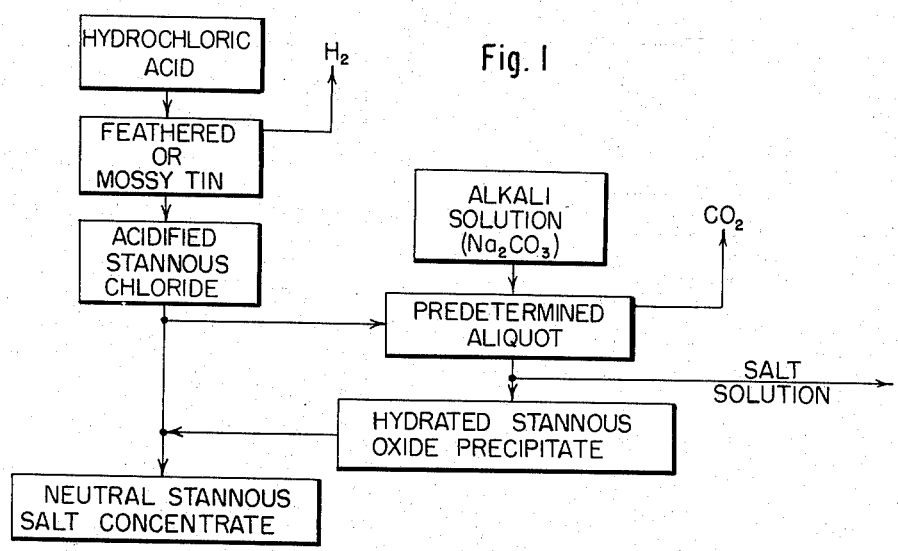
Fig. 1 is a flow sheet setting forth the steps of the preferred process.

Referring to Fig. 1, in the preferred process shown therein concentrated hydrochloric acid is reacted with feathered tin to produce an acidified stannous chloride solution, the acidity of which may readily be determined by titration and the amount of hydrated stannous oxide to react with and neutralize the free acid may be then calculated. The size of the aliquot to be withdrawn is thus determined and after such aliquot has been withdrawn it is transferred to a suitable reaction kettle or vessel where it is reacted with a slight excess of sodium carbonate. The size aliquot varies generally from about 10% to 25% of the total volume of the acidified stannous chloride, depending upon the completeness of the reaction. The reaction with sodium carbonate produces a hydrated stannous oxide which precipitates out and falls to the bottom of the kettle. The sodium chloride and any excess sodium carbonate solution may then be filtered, decanted or drawn off and if desired the precipitated hydrated stannous oxide may be washed, although this is generally unnecessary unless a high degree of purity is desired.

After having prepared the predetermined quantity of hydrated stannous oxide it is then transferred to the remainder of the acidified stannous chloride solution where it immediately reacts with the free acid to form a substantially neutral concentrated solution of stannous chloride. The concentrate thus formed is ready for use in the aforementioned process or it may be stored indefinitely in suitable containers without deterioration.

Figure 2:
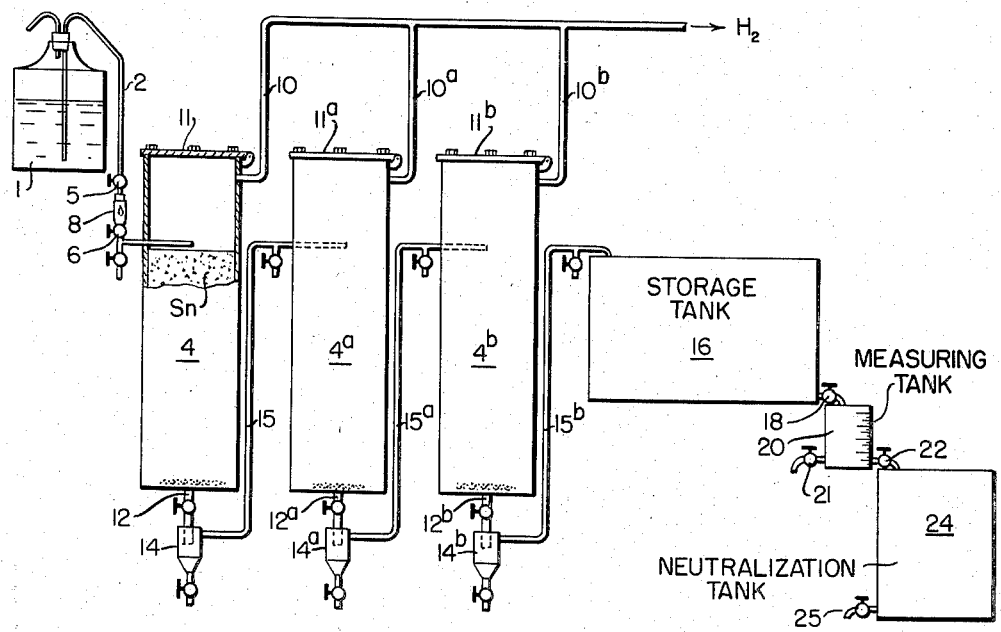
Fig. 2 is an elevation of what is now considered the preferred form of the apparatus.

The preferred form of apparatus for carrying out the above described process is shown in Fig. 2, wherein the numeral 1 designates a carboy or supply tank for holding the acid, which is connected by a line 2 with the upper part of the first of three reactors 4, 4a and 4b. The line 2 includes control valves 5 and 6, and sight or drip gage 8 by means of which the rate of flow of the acid into reactor 4 may be controlled. Each of the reactors consists of a copper or glass lined tank, the upper end of which is provided with a tube 10 to vent the hydrogen given off during the reaction, a pivoted cover or access door 11 through which the feathered tin Sn is charged, a screened discharge line 12 connected with a sludge trap 14, and a delivery line 15 connected to the upper part of the next reactor 4a. The second and third reactors 4a and 4b are similar to the first reactor as indicated by the corresponding reference characters, but the latter is connected to a rubber or glass lined storage tank 16, the reactors and tank being at substantially the same level so that flow therethrough is controlled by the admission of acid from tank 1. If desired, the second and third reactors may be jacketed so that extraneous heat may be applied to expedite the reaction, although this is not usually necessary.

The storage tank 16 is provided with a valved outlet 18 which runs into a measuring tank 20. The measuring tank 20 is provided with two valved outlets 21 and 22, the latter being connected with a neutralization tank 24 provided with a valved discharge line 25.

In operation each of the reactors is charged with feathered tin to about 75% of its volume, as indicated, and hydrochloric acid from the supply tank 1 is run into the first reactor at a predetermined rate which is controlled by the valve 5 and observed by the operator through the sight gage 8. After the required acid level in the first reactor has been obtained, the acidified stannous chloride solution flows into the second reactor 4a and then into the third reactor 4b where further reaction with the tin therein takes place.

The hydrogen evolved from each of the reactors passes out through vents 10, 10a and 10b and the final acidified solution passes into the storage tank 16. From time to time it is necessary to replenish the acid supply and recharge the reactors, particularly the first reactor 4 since the reaction therein is more vigorous than in the others and to this end the covers 11, 11a and 11b may be opened and tin added without stopping the operation. In passing from one reactor to the other entrained sludge is caught in traps 14, 14a and 14b and they may be opened periodically without interfering with the normal operation of the system.

When sufficient acidified stannous chloride solution has accumulated in the storage tank, its free acid content is determined by simple titrations. This permits calculation of the aliquot of stannous chloride necessary to produce the hydrated stannous oxide required for neutralization. This predetermined amount is then run off through the measuring tank 20 into the neutralization tank 24, where it is precipitated with a slight excess of sodium carbonate. After drawing off the supernatant liquid a cake of hydrated stannous oxide is left on the bottom of the neutralization tank, and acidified stannous chloride solution is then run from the storage tank through the measuring tank under vigorous stirring into the neutralization tank until all hydrated stannous chloride is dissloved. A mechanical stirrer is recommended. The thus formed neutral aqueous stannous chloride concentrate is withdrawn through the outlet 25.

Periodically through the day or operating period the neutralization procedure is repeated, but other than the periodic recharging of acid and tin and the neutralization of the stannous chloride solution, the apparatus requires no supervision. Where the rate of flow of acid through the reactors is such as to insure the formation of the optimum amount of stannous chloride per unit of time, the resulting concentrate contains approximately 1 kilogram of $SnCl_2 \cdot 2H_2O$ per liter of liquid (65%) and has a specific gravity of 1.65 at 70° F., although a concentration as high as 80% may be obtained. This concentrate may be readily diluted with water to provide a treating solution, or it may be bottled and stored for long periods of time without deterioration.

I claim:

1. The process of producing a relatively pure, substantially neutral aqueous stannous chloride concentrate, which comprises reacting metallic tin with hydrochloric acid to form an acidified stannous chloride solution, adding to said solution a separately and freshly prepared hydrated stannous oxide in sufficient quantity to neutralize the free acid of said solution and form a substantially neutral aqueous stannous chloride concentrate.

2. The process of producing a relatively pure, substantially neutral aqueous stannous chloride concentrate, which comprises reacting metallic tin with hydrochloric acid to form an acidified stannous chloride solution, withdrawing from said solution a predetermined aliquot, adding to said aliquot a water-soluble alkali in an amount sufficient to precipitate the tin component as a hydrated stannous oxide, and adding the freshly precipitated hydrated stannous oxide to the remainder of said solution to react with the free acid and form a substantially neutral aqueous stannous chloride concentrate.

3. The process set forth in claim 2, wherein said water-soluble alkali is sodium carbonate.

4. In the manufacture of a relatively concentrated, substantially neutral aqueous stannous chloride solution from a concentrated stannous chloride solution having a high free hydrochloric acid content, the steps comprising withdrawing from the acidified solution a predetermined aliquot, adding to said aliquot a water-soluble alkali in an amount sufficent to precipitate the tin component as a hydrated stannous oxide, and adding the freshly precipitated hydrous stannous oxide to the remainder of said solution to react with the free acid and form a substantially neutral aqueous stannous chloride.

References Cited in the file of this patent

UNITED STATES PATENTS

| | | |
|---|---|---|
| 810,454 | Acker | Jan. 23, 1906 |
| 877,248 | Sperry | Jan. 21, 1908 |
| 1,030,110 | McHitt | June 18, 1912 |
| 1,986,334 | Gearing | Jan. 1, 1935 |
| 2,419,528 | Biegel | Apr. 2, 1947 |
| 2,664,341 | Kesting | Dec. 29, 1953 |
| 2,667,433 | Gebhardt et al. | Jan. 26, 1954 |

OTHER REFERENCES

Mellor: "Comprehensive Treatise on Inorganic and Theoretical Chemistry," vol. 7, pages 388 and 425, Longmans, Green & Co., N. Y., 1927.